UNITED STATES PATENT OFFICE.

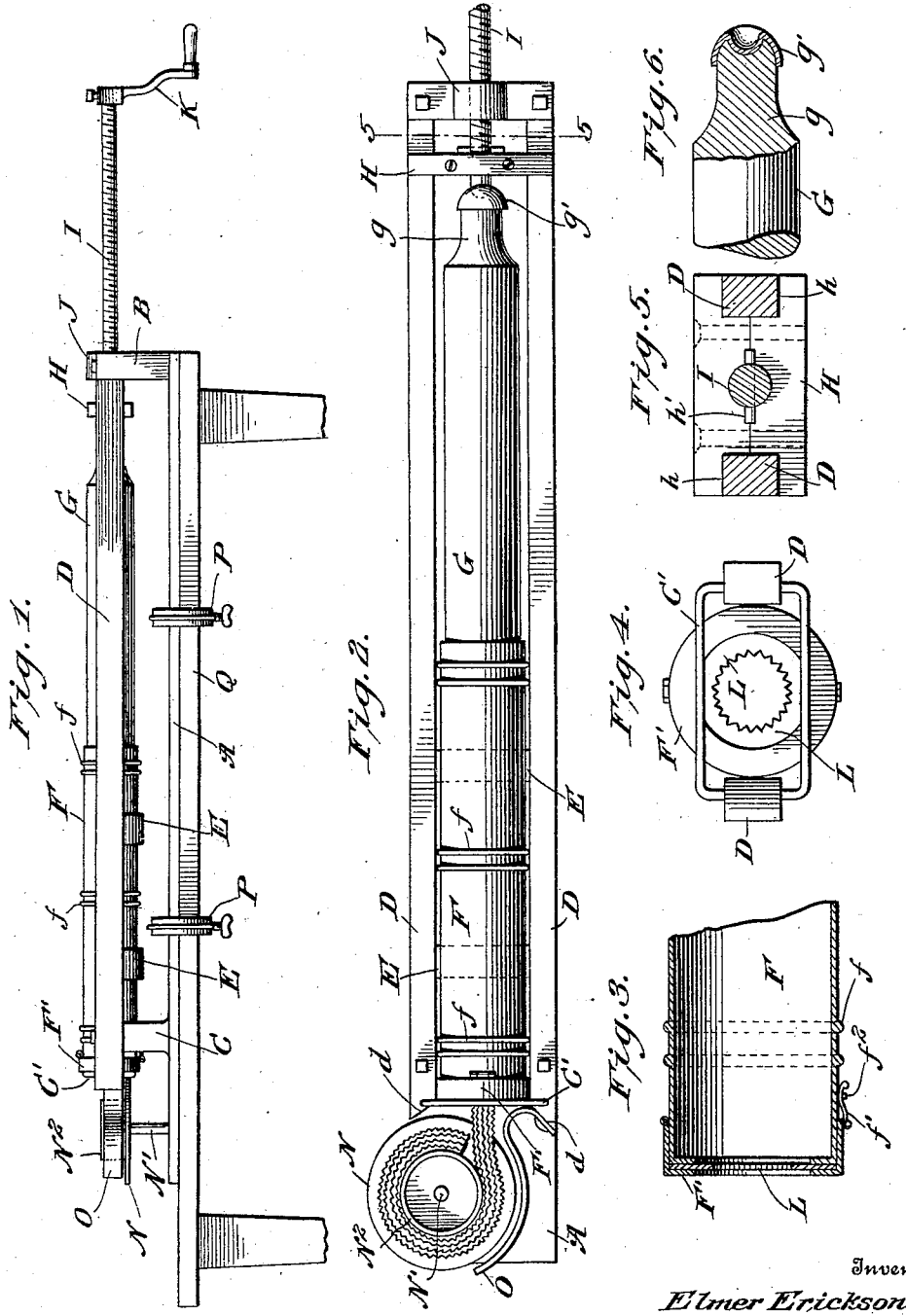

ELMER ERICKSON, OF RED OAK, IOWA.

CAKE-PRESS.

No. 914,711. Specification of Letters Patent. Patented March 9, 1909.

Application filed August 1, 1908. Serial No. 446,384.

*To all whom it may concern:*

Be it known that I, ELMER ERICKSON, a citizen of the United States, residing at Red Oak, in the county of Montgomery and State of Iowa, have invented certain new and useful Improvements in Cake-Presses, of which the following is a specification.

My invention relates to culinary utensils and particularly to a device for forming cakes, the object of my invention being to provide an apparatus which shall be capable of pressing out dough in the shape of a corrugated cylindrical body which may be afterward cut up to form cakes or cookies circular in shape and having a corrugated or pinked edge.

A further object of my invention is to provide a device of the class mentioned which may be readily taken apart for cleaning.

Other objects will appear hereinafter.

My invention consists in a machine having a base upon which is supported a cylinder provided at one end with a forming die having a serrated opening and at the other with a plunger, suitable mechanism also being provided whereby the plunger may be forced into the cylinder to force the dough therein contained out through the serrated opening of the forming die.

Another feature of my invention consists in providing a rotatable table upon which the formed mass of dough is adapted to be received and coiled as it is delivered from the press.

My invention also consists in the arrangement of parts and details of construction particularly set forth in the appended claim.

Figure 1, is a side elevation of my press. Fig. 2, is a plan view thereof. Fig. 3, is a fragmentary vertical section of the end of the cylinder and forming die. Fig. 4, is an end view thereof. Fig. 5, is a transverse section on line 5—5 of Fig. 2, and Fig. 6, is a vertical section of the inner end of the plunger and its cup.

As before stated the object of my invention is to make cakes or cookies of a circular shape having a pinked or serrated edge, and broadly my device consists of a cylinder suitably supported upon a base having at its forward end a die or former provided with a central opening, this opening having a serrated margin or margins of any other suitable character adapted to give edge serrations to a mass of dough forced out therefrom.

At its rear end the casing is provided with a plunger operated by a screw rod having a handle adapted to be turned, the plunger being guided upon suitable rails. At the forward end of the casing is provided a rotatable table upon which the pressed dough is received.

Referring particularly to the drawings, A designates a base upon one end of which is fixed the upright rear standard B, the other end of said base being provided with side standards C opposed to each other on opposite sides of the base. Fast upon the standards B and C and extending longitudinally along the base and parallel with each other are the guide rails D having outwardly beveled ends $d$.

Supported upon curved cradle-straps E fastened to the insides of the two side rails or in any other suitable manner is a metal cylinder F made of sufficiently strong material to withstand the pressure of the dough in its interior when acted upon by the plunger. Preferably the cylinder is corrugated at intervals as at $f$, or otherwise strengthened. At its forward end the cylinder is formed with an annular flange $f^3$, and provided with a hinged lid F′ having at one end the latch $f'$ which is adapted to engage with a pin $f^2$ projecting from the opposite side of the cylinder. The lid or cover is adapted to be turned back so as to entirely unclose the opening of the cylinder and to receive the forming die L. The lid F′ is provided with a central opening $f^4$ coextensive in size with the opening in the end of the cylinder defined by the inturned flange $f^3$.

Fitting between the lid or cover F′ and the extremity of the cylinder is the die L. This die is made of any suitable material but preferably of sheet metal having a central opening, the edges of which are pinked or notched as shown in the detail view Fig. 4.

At its rear end the cylinder is entirely open for the reception of the plunger G. The cylinder is held in position between the rails C and prevented from being forced forward under the action of the plunger by a transverse yoke C′ supported in the rails C a short distance from the forward ends thereof. The rear end of the plunger is tapered as at $g$ and has a rounded head formed with a socketed metal cap $g'$ into which the extremity $i$ of the screw I fits.

H designates a cross-head which at its sides is cut out as at $h$ to fit over the guide rails C and through this cross-head the forward end of the screw I projects, a pin $h'$ on the screw bearing against said head. Bolted upon the upper face of the block B is a screw threaded bearing J through which the screw I moves. As the screw is rotated by the crank K, it will engage with the screw threads of the bearing and will move forward, moving with it the cross-head H and forcing the plunger G forward into the cylinder F.

As will be seen from Fig. 1 the base A projects out beyond the extremity of the cylinder and of the slide rails, and carries upon it the rotatable table N. This table is circular in plan and has a central hub $N^2$. It is so mounted as either to rotate on a fixed spindle or to rotate with the spindle. The table is thus so mounted upon a spindle N' that as the dough is forced out of the cylinder A, it will strike against the face of the table and rotate it thus carrying the dough around the central hub.

In order to guide the dough into the table there is provided a curved shield O located at one side of the table, which as the dough passes out guides it into the place around the enlarged center $N^2$ of the table. I have shown this shield as supported on the end of the rails D. Clamps P are provided whereby the base may be attached to a suitable support or table Q.

The operation of my device is as follows: The cylinder F is removed from its supporting bands E and the lid turned back. It is then filled with dough and the die with the serrated opening is placed between the end of the cylinder and the hinged lid. The plunger is then inserted in the bottom of the cylinder and pressed inward into contact with the dough, the screw I then turned and the plunger moved inward, slowly forcing out a cylinder of dough having a longitudinally corrugated circumference. This cylinder as it is received upon the table rotates the same until the dough has been entirely coiled upon the table. The coiled dough is then removed and cut into slices forming cakes or cookies having a serrated margin.

The device is simple, it can be easily operated and is particularly convenient where a large number of cookies are to be made. It is compact and provides a movable table for the reception of the dough without the necessity of the table occupying much space. The parts are easily disassembled and can be readily kept clean.

It will be seen that this press operates as well with a small amount of dough as with a large amount, and that forming dies having openings of different shapes may be used if desired. The press I have devised obviates the necessity of cutting cookies or cakes from a sheet of dough, and permits such cakes to be made much more cheaply than by the old method. While I have referred to cutting the coiled cylinder into flat cookies, it is obvious that the coiled dough with its longitudinal corrugations might be baked in this form if desired, and that my press is equally well adapted for forming long rods or cylinders of dough to be afterward twisted into shape for pretzels or doughnuts.

While I have shown what I believe to be the preferable form of my invention, I do not wish to be limited thereto, as the spirit thereof might be embodied in other presses, neither do I wish to be confined to a cylindrical form for the casing F' as it might be square or polygonal without change in its function or mode of operation.

Having thus described my invention what I claim as new and desire to secure by Letters Patent is:

In a cake press, a base, standards supported on said base, longitudinal guide rails mounted on said standards, a cylinder supported between said rails, the rear end of said cylinder being open, an annular flange on the front end of said cylinder, a hinged lid having a central opening, a forming die, located at the forward end of said cylinder between said flange and said lid, a plunger fitting in and adapted to move into said cylinder, a cross-head mounted on said guide rails, a bearing mounted upon the rear standard, a shaft threaded through said bearings and cross-head and engaging the plunger, a pin extending through said screw and engaging said cross-head, and a crank on said shaft, substantially as described.

In testimony whereof I have signed my name to this specification in the presence of two subscribing witnesses.

ELMER ERICKSON.

Witnesses:
A. J. SMITH,
J. JOHNSON.